UNITED STATES PATENT OFFICE.

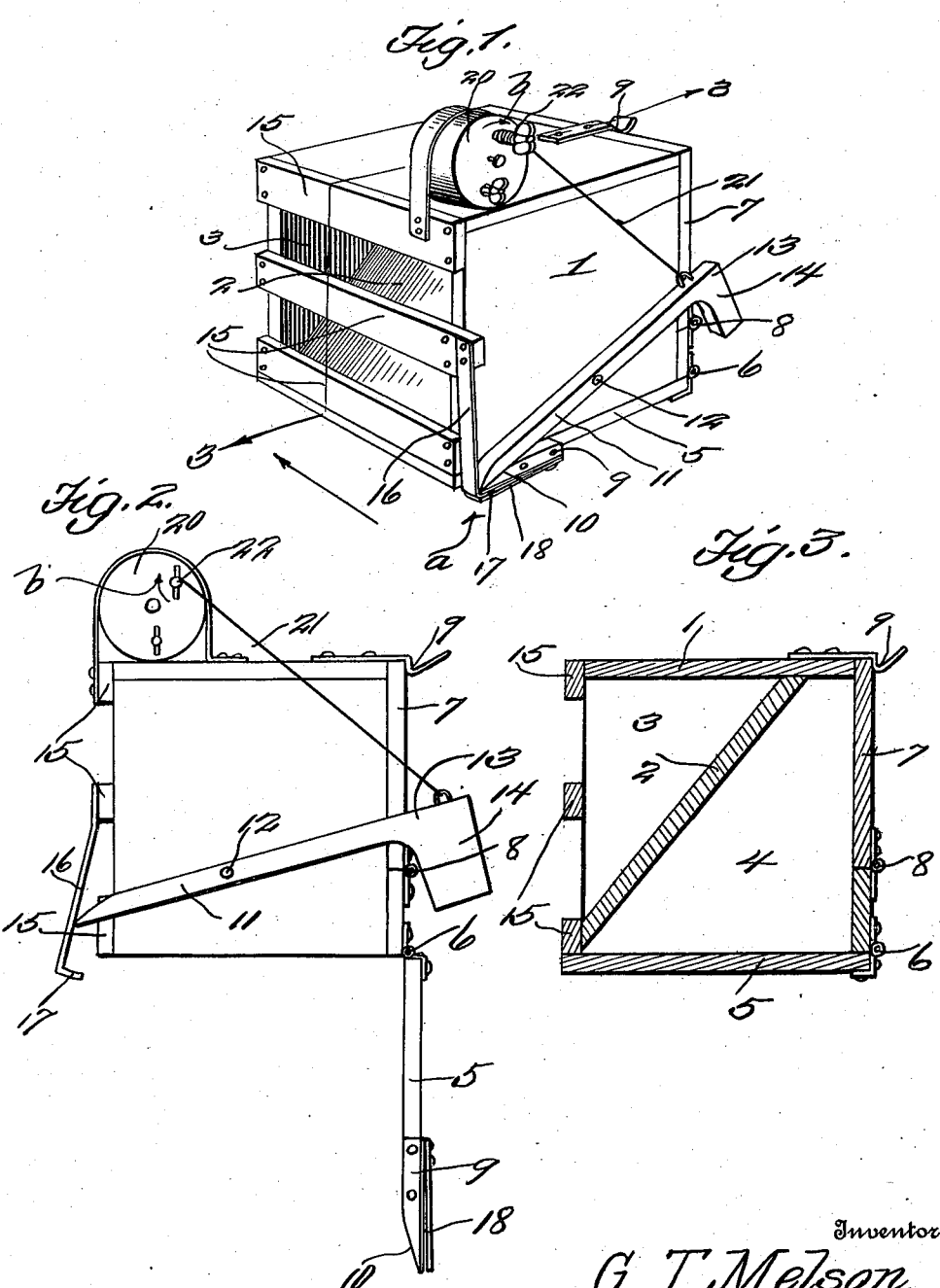

GEORGE T. MELSON, OF COLEMAN, FLORIDA.

TIME STOCK-FEEDER.

1,014,163.  Specification of Letters Patent.  Patented Jan. 9, 1912.

Application filed July 29, 1911. Serial No. 641,373.

*To all whom it may concern:*

Be it known that I, GEORGE T. MELSON, a citizen of the United States, residing at Coleman, in the county of Sumter and State of Florida, have invented a new and useful Time Stock-Feeder; and I do hereby declare the following to be a full, clear, and exact description of the invention, such as will enable others skilled in the art to which it appertains to make and use the same.

This invention relates to a new and useful automatic time stock-feeding apparatus.

The principal object of the invention is to provide an automatic feeder, the door of which may be automatically released by an alarm attachment to a clock or the like at a pre-determined moment, so as to permit food for animals to be automatically deposited into a feeding trough or manger, thus obviating the necessity of the hostler or farmer rising early in the morning to feed the horses.

The invention comprises further features and combination of parts as hereinafter set forth, shown in the drawings and claimed.

In the drawings:—Figure 1 is a view in perspective of the feeder, constructed in accordance with the invention. Fig. 2 is a view in side elevation, showing the door released. Fig. 3 is a sectional view on line 3—3 of Fig. 1.

Referring more especially to the drawings 1 designates a rectangular receptacle having an inclined partition 2, which divides the receptacle in two compartments 3 and 4. The compartment 4 is designed to contain the animal food, and is closed at its bottom by the door 5, hinged at 6, while the rear of the compartment is closed by the closure 7. The closure 7 is hinged at 8, and is provided with a latch 9. The animal food is deposited in the compartment 4, by opening the closure 7.

Upon one of the side edges of the door 5 a cleat 9 is arranged, the free end of which is beveled as at 10, against which the free end of the gravitating oscillatory lever 11 contacts. The lever 11 is pivoted upon the pin 12, and the end 13 of the lever is formed with an enlargement 14, thus constituting a weight.

Extending across the open face of the receptacle 1 is a plurality of strips 15, one of which extends beyond the receptacle. Secured to the extended portions of one of the strips 15 is a spring arm 16, having an angled end 17, which engages between the cleat 9 and the spring facing strip 18, which is secured at one end to the cleat 9. The object for providing the facing strip is to prevent the animal or other means from accidentally disengaging the angled end of the spring arm from the cleat 9, by the animal rubbing his nose along the under face of the cleat 9 in the direction of the arrow *a*. The end portion of the gravitating rocking lever 11, which engages the bevel end of the cleat 9 is disposed in contact with the spring arm, so that as the lever 11 is oscillated or rocked, the free portion thereof will slide upwardly against the spring arm, thus forcing the same outwardly to disengage the angled end of the arm from between the spring facing strip and the cleat 9, which will allow the door 5 to swing downwardly, thus depositing the animal food in the feeding trough or manger.

Secured on the top of the receptacle 1 is an alarm clock 20 of the usual construction. Connected to the weighted end 13 of the lever 11 is a cord or wire 21, one end of which is wound about the key 22 of the alarm clock or apparatus. The cord is wound around the key, so as to unreel, as the key turns, by the unwinding of the spring of the alarm apparatus.

In operation, the alarm apparatus is set so as to feed the food to the stock at an hour and as the spring of the alarm apparatus unwinds, the key 22 turns in the direction of the arrow *b*, which causes the cord to unreel. As the cord is unreeling the lever 11 tilts or rocks on its pivot, by virtue of the weighted end 13, thus causing the other end of the lever to force the spring arm outwardly, which in turn releases the door 5, whereby the food may be deposited in the trough or manger (not shown) at a predetermined moment.

The invention having been set forth, what is claimed as new and useful is:—

1. In combination, a receptacle having a food containing compartment, a hinge bottom therefor having a cleat upon one of its side edges, a spring arm secured to the receptacle and provided with an angle end to engage the cleat to support the hinge bottom in a closed position, a gravitating rocking lever disposed in contact with the spring arm and the cleat for releasing the spring arm from engagement with the cleat, and a spring facing strip secured at one end to the cleat, between which and the cleat the angled end of the spring arm is arranged to prevent the angled end from being pushed from engagement with the cleat.

2. In combination, a receptacle having a food containing compartment, a hinge bottom therefor having a cleat upon one of its side edges, a spring arm secured to the receptacle and provided with an angled end to engage the cleat to support the hinge bottom in a closed position, a gravitating rocking lever disposed in contact with the spring arm and the cleat for releasing the spring arm for engagement with the cleat, and a spring facing strip secured to one end to the cleat, between which and the cleat the angled end of the spring arm is arranged to prevent the angled end from being pushed from engagement with the cleat, and means to oppose the gravitating rocking lever, the means adapted to be automatically operated, so as to relieve the opposition to the lever and permit the same to gravitate.

In testimony whereof I have signed my name to this specification in the presence of two subscribing witnesses.

GEORGE T. MELSON.

Witnesses:
 GEORGE T. CONDREY,
 R. P. BRYAN.

Copies of this patent may be obtained for five cents each, by addressing the "Commissioner of Patents, Washington, D. C."